United States Patent [19]

Shirai

[11] Patent Number: 4,532,711
[45] Date of Patent: Aug. 6, 1985

[54] MICROMETER HEAD

[75] Inventor: Tamenori Shirai, Kure, Japan

[73] Assignee: Mitutoyo Mfg. Co., Ltd., Tokyo, Japan

[21] Appl. No.: 507,832

[22] Filed: Jun. 24, 1983

[30] Foreign Application Priority Data

Jul. 27, 1982 [JP] Japan .......................... 57-114354[U]

[51] Int. Cl.³ .......................... G01B 3/18; G01B 5/00
[52] U.S. Cl. ................................................... 33/164 R
[58] Field of Search .................. 33/164 R, 164 B, 163

[56] References Cited

U.S. PATENT DOCUMENTS 3,750,296  8/1973  Kindl et al. ...................... 33/164 R
4,174,575 11/1979  Nakata ............................. 33/164 R Primary Examiner—Harry N. Haroian
Attorney, Agent, or Firm—Flynn, Thiel, Boutell & Tanis

[57] ABSTRACT

A micrometer head adapted to be mounted to a measuring instrument or the like and used for measuring and precision feeding includes an adjusting ring (23) spaced a predetermined distance apart from a thimble (6). This adjusting ring (23) is connected to an intermediate tubular member (16) which is provided on a sleeve (15) coupled onto a spindle (1) in a manner so as to be rotatable relative to the sleeve (15). A coil spring (35) is confined between the adjusting ring (23) and a graduation ring (17) disposed inside the thimble (6). Rotation of the adjusting ring (23) causes the spindle (1), sleeve (15), graduation ring (17) and thimble (6) to be simultaneously moved relative to a mount fixable portion (31) adapted to be mounted to the measuring instrument or the like.

11 Claims, 2 Drawing Figures

MICROMETER HEAD

BACKGROUND OF THE INVENTION

1. Field of the Invention

This invention relates to micrometer heads each mounted to a measuring instrument and a precision instrument for being utilized in measuring, precise feeding, positioning and the like, and more particularly to improvements in a zero adjusting mechanism (a reference position adjusting mechanism) of a micrometer head.

2. Description of the Prior Art

In general, the conventional micrometer heads are of a so-called screw-feed type, in each of which a spindle threadably coupled to a sleeve is transferred in the axial direction thereof due to rotation of a thimble. With the micrometer head of the type described, it is very convenient to be able to conduct the graduation matching at the reference position, i.e., zero adjustment when the micrometer head is mounted to a measuring instrument or the like.

The zero adjusting mechanism of the micrometer head is divided into two types. The first type is constructed such that the micrometer head is mounted to the measuring instrument or the like, the spindle is transferred to the reference position, and thereafter, the graduation is forcedly matched with the end edge of the thimble, that is, the zero adjustment is conducted. The other type is of such an arrangement that the graduation is previously matched with the end edge of the thimble, that is, the zero adjustment is conducted, and thereafter, the spindle is transferred to the reference position with the graduation position being left as it is. The latter is preferable from the above-described two types for matching of the graduation.

As the micrometer heads belonging to the latter type, i.e., the one in which the graduation matching is conducted, and thereafter, the spindle is transferred to the reference position with the graduation position being left as it is, there has heretofore been known one in which the conventional mechanism for transferring the spindle and the zero adjusting mechanism are provided separately of each other, and there is further provided a friction engaging means for suitably changing from one mechanism over to another (Japanese Utility Model Application Publication No. 22484/80), or the other, in which there is provided a change-over mechanism utilizing a link mechanism and the like, for example. However, the one adopting the friction engaging means is disadvantageous in that the operation is unstable and wear is high. The other adopting the change-over device is disadvantageous in that the working efficiency is very low, and the conventional operating section for transferring the spindle and the operating section for the zero adjustment are disposed close to each other, whereby it is combersome in use and the controllability is low. Furthermore, both constructions of the micrometer heads of the prior art are complicated in construction as a whole, require troublesome assembling work, are difficult to be manufactured at low costs, have a large number of parts and are low in controllability, so that the feed with high accuracy cannot be achieved satisfactorily.

SUMMARY OF THE INVENTION

The present invention has as an object the provision of a micrometer head which is simplified in construction, high in controllability and capable of feeding with high accuracy.

To this end, the present invention contemplates that, in a so-called screw feed type micrometer head in which a spindle threadably coupled to a sleeve is transferred in the axial direction thereof due to rotation of a thimble, an intermediate tubular member is coupled onto the thimble in a manner to be movable relative to the thimble, the intermediate tubular member and the sleeve are connected to each other through a connecting means in a manner to be simultaneously movable in the axial direction of the spindle, a graduation ring disposed inside the thimble and having an outer peripheral surface exposed from one end edge of the thimble is synchronously rotatably connected to the sleeve, the intermediate tubular member is threadably coupled to a mount fixable portion, the intermediate tubular member being connected thereto with an adjusting ring spaced a predetermined distance apart from the thimble in a manner to be synchronously rotatable with the intermediate tubular member, and the sleeve, spindle, graduation ring and thimble are adapted to simultaneously move in the axial direction of the spindle relative to the mount fixable portion due to rotation of the adjusting ring. In conducting the usual feed of the spindle and the usual graduation position matching, the thimble is rotated under a condition where the sleeve is unrotatable relative to the mount fixable portion, and in conducting the reference position matching of the spindle with the graduation position being not displaced the adjusting ring is rotated to cause the sleeve, spindle, intermediate tubular member and thimble to move integrally, i.e., simultaneously in the axial direction of the spindle relative to the mount fixable portion without rotating relative to one another.

DETAILED DESCRIPTION OF THE PREFERRED EMBODIMNETS

Figure 1:
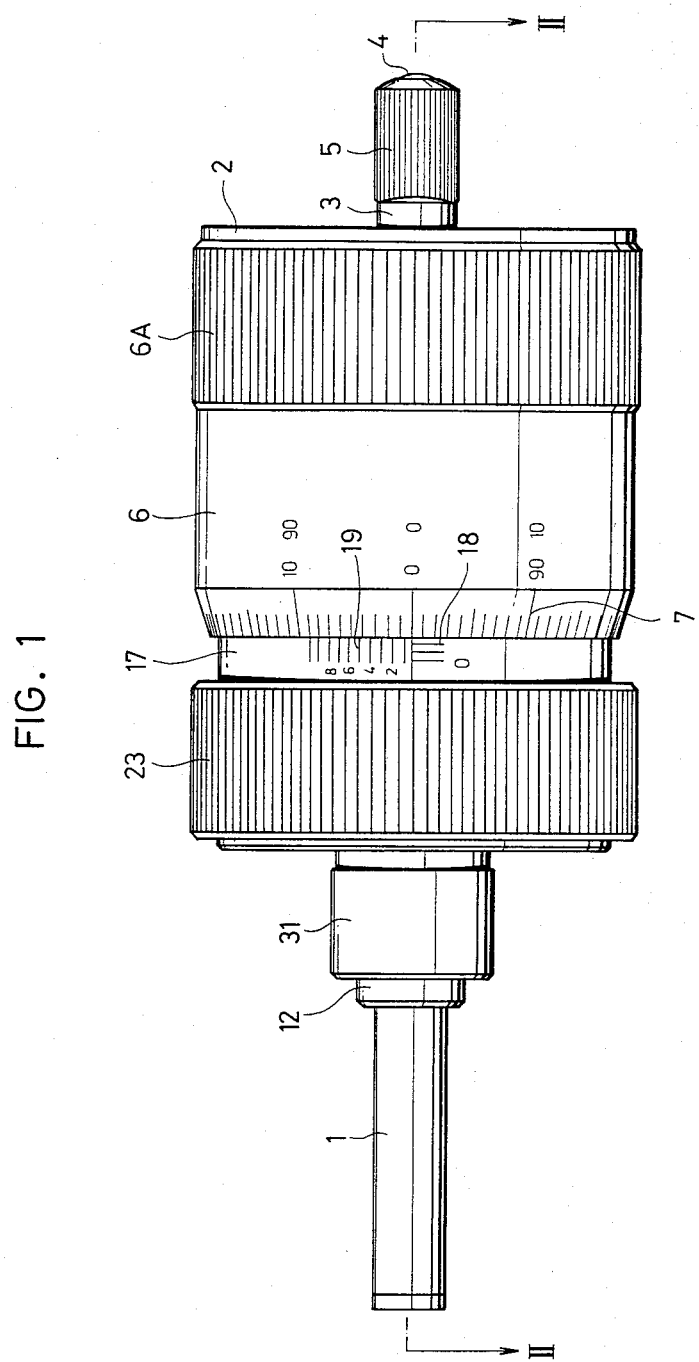
FIG. 1 is a top view showing the general arrangement of one embodiment of the micrometer head according to the present invention.
Figure 2:
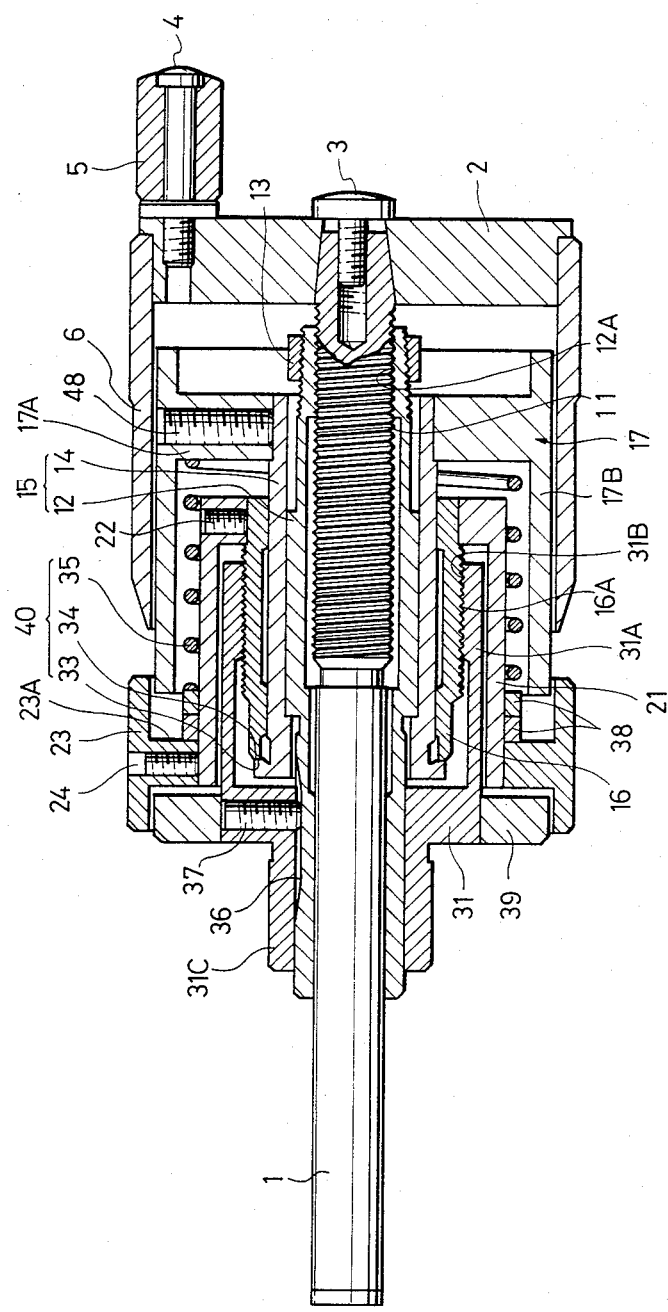
FIG. 2 is a sectional side view taken along the line II—II in FIG. 1.

FIGS. 1 and 2 show the general arrangement of one embodiment of the micrometer head according to the present invention. In these drawings, taperedly coupled onto the proximal end of a rod-like spindle 1 is a central portion of a thick-wall disk-shaped cover member 2 which is fixed by a locking bolt 3.

A finger grip 5 is rotatably mounted at a predetermined position close to the outer peripheral edge of the cover member 2 through a mounting bolt 4 disposed in parallel to the axial direction of the spindle 1. Furthermore, one end portion of a cylindrical thimble 6 is affixed to the outer peripheral edge of the cover member 2, and the outer peripheral surface at the other end portion of the thimble 6 is formed with a thimble graduation 7.

A precision finished threaded portion 11 is formed on the outer peripheral surface of the proximal end portion of the spindle 1 over a predetermined range in the axial direction of the spindle 1. The spindle 1 extends through a substantially round tubular inner sleeve 12 and is rotatably and axially movably supported by the inner sleeve 12. A precision finished threaded portion 12A formed on the inner peripheral surface at the proximal end portion of the inner sleeve 12 is threadably coupled to the threaded portion 11 of the spindle 1, and threadably coupled onto the outer periphery of the inner sleeve 12 at the aforesaid threadably coupled portion is a taper nut 13. A cylindrical outer sleeve 14 is coupled and bonded onto the outer peripheral portion of the inner sleeve 12, and the inner sleeve 12 and the outer sleeve 14 constitute a sleeve 15.

A cylindrical intermediate tubular member 16 is coupled onto the outer peripheral portion of the outer sleeve 14 in a manner so as to be rotatable and movable in the axial direction of the spindle 1 with respect to sleeve 14. A graduation ring 17 of a bottomed cylinder shape is affixed to the proximal end portion of the outer sleeve 14 through a set screw 48. Penetrating through the central portion of a bottom portion 17A of the graduation ring 17 is the outer sleeve 14. A cylindrical portion 17B of the graduation ring 17 is disposed close to the inner peripheral surface of the thimble 6. One end portion of the cylindrical portion 17B of the graduation ring 17 is extended toward the forward end of the spindle 1 beyond one end edge of the thimble 6, and the outer peripheral surface thereof is exposed to the outside. On the outer peripheral surface thus exposed, a main graduation 18 is provided in the axial direction of the spindle 1 and a vernier graduation 19 is formed in the circumferential direction (refer to FIG. 1).

On the other hand, the right end portion of a connecting tubular member 21 of a substantially cylindrical shape is solidly secured to the right end in the drawing of the intermediate tubular member 16 through a set screw 22, and an adjusting ring 23 of a substantially ring shape is affixed to the outer peripheral portion at the left end of this connecting tubular member 21 through a set screw 24. The adjusting ring 23 is formed to have an outer diameter substantially equal to that of the thimble 6. The outer peripheral surface of the adjusting ring 23 has a non-slip finish such as nicking or knurling so as to be easily grasped. The adjusting ring 23 and the thimble 6 are spaced a predetermined distance apart from each other in the axial direction of the spindle 1. The forward end portion of the graduation ring 17 may be positioned within the inner periphery of the adjusting ring 23.

A space of a predetermined value is formed between the outer periphery of the intermediate tubular member 16 and the inner periphery of the connecting tubular member 21 in the circumferential direction. Inserted into this space is a large diameter portion 31A of a mount fixable portion 31 of a substantially stepped cylindrical member shape to be solidly secured to a measuring instrument or the like, not shown. A threaded portion 31B is formed on the inner peripheral surface of the large diameter portion 31A. Threadably coupled to this threaded portion 31B is a threaded portion 16A formed on the outer peripheral portion of the intermediate tubular member 16. Formed on the left end edge in the drawing of the intermediate tubular member 16 is an abutting surface 33 perpendicular to the axial direction of the spindle 1. Formed at the left end of the outer sleeve 14 is an abutting surface 34 similarly perpendicular to the axial direction of the spindle 1 and facing to the right in the drawing. The abutting surfaces 33 and 34 can be brought into abutting contact against each other. These abutting surfaces 33 and 34 are constantly brought into abutting contact with each other through the resiliency of a compression coil spring 35 which serves as a biasing means is confined between the right side surface in the drawing of an inner wall portion 23A of the adjusting ring 23 and the left side surface in the drawing of the bottom portion 17A of the graduation ring 17, is inside the cylindrical portion 17B of the graduation ring 17, and surrounds the connecting tubular member 21. Here, the abutting surfaces 33, 34 and the compression coil spring 35 form a connecting means 40.

The left end portion of the inner sleeve 12 is inserted into a small diameter portion 31C of the mount fixable portion 31 in a manner to be movable in the axial direction of the spindle 1. A keyway 36 is formed at a predetermined position on the outer peripheral surface of the inner sleeve 12 which is located within the small diameter portion 31C and extends over a predetermined range in the axial direction of the spindle 1. Slidably fitted into this keyway 36 is the forward end portion of a key 37 affixed to the mount fixable portion 31. Through the agency of the keyway 36 and key 37, the inner sleeve 12 is made nonrotatable relative to the mount fixable portion 31 and movable within a predetermined range in the axial direction of the spindle 1.

In the drawing, reference numeral 38 indicates a sliding ring provided at one end of the compression coil spring 35, 39 a cover ring coupled and fixed onto the mount fixable portion 31, and 6A a grip portion formed on the outer peripheral surface of the thimble 6 on the side of the finger grip 5, the outer peripheral surface having a non-slip finish such as nicking.

Description will hereunder be given of the operation of this embodiment.

Firstly, zero position matching between the graduations 7, 18 and 19 (any reference value matching other than zero may be adopted) is conducted, that is, zero adjustment is performed. For the zero adjustment, the thimble 6 is rotated with the finger grip 5 being gripped or the grip portion 6A of the thimble 6 being directly grasped. Rotation of the thimble 6 causes the spindle 1 to be rotated in unison therewith. The sleeve 15 threadably coupled to the spindle 1 is movable in the axial direction thereof relative to the mount fixable portion 31, but is locked against rotation by the keyway 36 and key 37. Moreover, the mount fixable portion 31 is solidly secured directly or through an attachment, etc. to a measuring instrument or the like, not shown. In consequence, the spindle 1 and thimble 6 move in the axial direction thereof as commensurate to a rotational value of the thimble 6 relative to the sleeve 15, i.e., the mount fixable portion 31.

On the other hand, the graduation ring 17 is solidly secured to the sleeve 15 and, even if the thimble is rotated, the graduation ring 17 is neither rotated nor moved in the axial direction thereof. In consequence, rotation of the thimble 6 causes the thimble 6 to be rotated relative to the graduation ring 17 and moved in the axial direction thereof as commensurate to the rotational value thereof, whereby the position matching of one end edge of the thimble 6 with the main graduation 18, i.e., the zero adjustment is conducted as referenced from the vernier graduation 19 and/or the thimble graduation 7. Additionally, the above-described zero adjustment causes the spindle 1 to move in the axial direction thereof. However, even if the spindle 1 moves to any position in this step, it does not matter because this is done prior to the reference position matching of the spindle 1.

The reference position matching of the spindle 1 will now be conducted. Firstly, if an operator's hand is moved from the finger grip 5 or the grip portion 6A of the thimble 6 to the adjusting ring 23 and the adjusting ring 23 is gripped and rotated, then the intermediate tubular member 16 solidly secured to the adjusting ring 23 is rotated in synchronism therewith, and the intermediate tubular member 16 is moved in the axial direction of the spindle 1 as commensurate to the rotating value of the adjusting ring 23, because the intermediate tubular member 16 is threadably coupled to the mount fixable portion 31. The movement of the intermediate tubular member 16 in the axial direction of the spindle 1 causes the sleeve 15, which is connected thereto through the connecting means 40 so as to be simultaneously movable in the axial direction of the spindle 1 to move simultaneously. Since the sleeve 15 is locked against rotation relative to the mount fixable portion 31, the movement of the sleeve 15 does not involve a rotary motion relative to the mount fixable portion 31, whereby the spindle 1 threadably coupled to the sleeve 15 is moved simultaneously, so that the aforesaid sleeve 15, spindle 1, graduation ring 17 and thimble 6 can be simultaneously moved in the axial direction of the spindle 1 without being rotated relative to one another. More specifically, no relative rotation occurs between the graduation ring 17 solidly secured to the sleeve 15 and the thimble 6, so that the positional relationship between the graduations 7, 18 and 19 can be maintained in the same conditions as in the zero adjusting. In addition, when the adjusting ring 23 is grasped and rotated, there is no possibility of rotating the thimble 6 by mistake because the adjusting ring 23 and the thimble 6 are spaced a predetermined distance apart from each other.

The present embodiment with the above arrangement can offer the following advantages.

Upon rotation of the thimble 6 for the zero adjustment, the adjusting ring 23 can be immediately rotated to conduct the reference position matching of the spindle, without any particular change-over operation and the like being required, thereby resulting in high controllability and very quick measuring operations.

Furthermore, the adjusting ring 23 is spaced the predetermined distance apart from the thimble 6, whereby there is no possibility of touching the thimble 6 by mistake during the rotation of the adjusting ring 23, so that high controllability can be attained and adjustment with high accuracy can be easily conducted.

Further, the adjusting ring 23 is adapted to move together with the spindle 1, that is, the adjusting ring 23 is not forcedly moved, whereby no excessively high operating force is required, so that high controllability can be attained and measuring operations with high accuracy can be easily performed.

Moreover, the sleeve 15 and the intermediate tubular member 16 are connected to each other through a connecting means 40 comprising the abutting surfaces 33, 34 and the compression coil spring 35, whereby there is no possibility of occurrence of a backlash between the intermediate tubular member 16 and the sleeve 15, so that the sleeve 15 and the intermediate tubular member 16 can be accurately and simultaneously moved at all times. Furthermore, the spindle 1 is subjected to a pressing force from the measuring instrument or the like. However, there is avoided a danger that a change in the aforesaid pressing force affects the meshing engagement between the threaded portions 11 and 12A of the spindle 1 and the sleeve 15 due to the resiliency of the compression coil spring 35, so that the accurate feed of the spindle 1 can be achieved.

Moreover, component parts are formed about the center axis of the spindle 1 or are disposed concentrically with the center axis of the spindle 1, whereby the general construction is simplified, assembling work is facilitated, and further, the measuring accuracy is highly improved.

In the present invention, the mount fixable portion 31 has been coupled onto the sleeve 15 through a rotation locking mechanism comprising the keyway 36 and the key 37. However, this arrangment may be replaced by such an arrangement that the sleeve 15 is suitably locked in rotation against the mount fixable portion 31 through a clamp screw or the like, for example. Furthermore, the sleeve 15 includes the inner sleeve 12 and outer sleeve 14, both of which have been bonded together, however, both may be integrally formed of one and the same material. However, the separate formation of the inner sleeve 12 and outer sleeve 14 can facilitate the finishing work, and moreover, can facilitate the hardening of the abutting surface 34, so that the hardening work can be satisfactorily conducted. Further, the connecting means 40 includes the abutting surfaces 33, 34 and the compression coil spring 35. This arrangement, however, is not exclusive and may be replaced by such an arrangement that, for example, the sleeve 15 and the intermediate tubular member 16 are arranged such that both members may be abutted against each other when they move in directions opposite to those in the above-described embodiment, and there is provided a biasing means for biasing both members to abut against each other.

As has been described hereinabove, the present invention results in the micrometer head being simplified in construction, high in controllability and capable of feeding with high accuracy.

What is claimed is:

1. In a micrometer head wherein a spindle threadably coupled to a sleeve is moved in the axial direction relative to said sleeve in response to rotation of a thimble which is coupled to said spindle for synchronous rotation therewith, the improvement comprising an intermediate tubular member supported on said sleeve in a manner so as to be movable axially and rotationally relative to said sleeve, wherein said intermediate tubular member is connected to said sleeve through a connecting means in a manner so as to be simultaneously movable with said sleeve in the axial direction of said spindle, wherein said intermediate tubular member is synchronously rotatably connected with an adjusting ring spaced a predetermined distance apart from said thimble, wherein a graduation ring is disposed inside said thimble and has an outer peripheral surface exposed beyond one end edge of said thimble, said graduation ring being synchronously rotatably connected to said sleeve, wherein said intermediate tubular member is threadedly coupled to a mount fixable portion which is adapted to be mounted to a measuring instrument, and wherein rotation of said intermediate tubular member due to rotation of said adjusting ring relative to said mount fixable portion causes said sleeve, said spindle, said graduation ring and said thimble to be simultaneously moved in the axial direction of said spindle relative to said mount fixable portion.

2. A micrometer head as set forth in claim 1, wherein said connecting means comprises abutting surfaces formed on said sleeve and said intermediate tubular member, respectively, so that said sleeve and said intermediate tubular member can abut against each other in the axial direction of said spindle, and a biasing means for biasing said sleeve and said intermediate tubular member so that said abutting surfaces on said sleeve and said intermediate tubular member are constantly in abutting contact against each other.

3. A micrometer head as set forth in claim 2, wherein said biasing means comprises a compression coil spring.

4. A micrometer head as set forth in claim 3, wherein said compression coil spring is confined between a bottom portion of said graduation ring and an inner wall portion of said adjusting ring.

5. A micrometer head as set forth in claim 1, wherein said sleeve is coupled to said mount fixable portion in a manner so as to be fixed against rotation relative thereto and movable in the axial direction of the spindle relative thereto.

6. A micrometer head as set forth in claim 5, wherein a keyway engageable with a key provided on said mount fixable portion is formed on an outer periphery of said sleeve and extends in the axial direction of said sleeve.

7. A micrometer head as set forth in claim 1, wherein said adjusting ring is connected to said intermediate tubular member by a connecting tubular member.

8. A micrometer head comprising:
a spindle;
a sleeve including an inner sleeve axially movably, threadably coupled onto the outer periphery of said spindle and an outer sleeve coupled onto the outer periphery of said inner sleeve;
a graduation ring of a bottomed cylinder shape solidly secured to the outer peripheral surface of one end of said sleeve;
a thimble rotatably encircling the outer peripheral surface of said graduation ring and connected through a cover member with said spindle so as to be synchronously rotatable with said spindle;
an intermediate tubular member coupled onto said sleeve in a manner so as to be rotatable relative to said sleeve;
an adjusting ring connected and solidly secured through a connecting tubular member to said intermediate tubular member in a manner so as to be synchronously rotatable therewith and spaced a predetermined distance apart from said thimble;
a connecting means which includes a biasing means confined between said adjusting ring and said graduation ring and biasing said adjusting ring and said graduation ring to be separated from each other and which causes said intermediate tubular member and said sleeve to be simultaneously movable in the axial direction of said spindle due to rotation of said adjusting ring; and
a mount fixable portion threadably coupled onto the outer peripheral surface of said intermediate tubular member and coupled to said sleeve such that said sleeve is movable in the axial direction relative thereto and is fixed against rotation relative thereto.

9. A micrometer head as set forth in claim 8, wherein said biasing means comprises a compression coil spring surrounding said connecting tubular member.

10. A micrometer head as set forth in claim 8, wherein said connecting means includes abutting surfaces formed at respective ends of said outer sleeve and said intermediate tubular member so that said abutting surfaces on said outer sleeve and said intermediate tubular member are urged against each other in the axial direction of the spindle by the resiliency of said biasing means.

11. A micrometer head as set forth in claim 8, wherein a keyway is formed in the outer peripheral portion of said inner sleeve and a key provided on said mount fixable portion is engaged with said keyway.

* * * * *